No. 612,201. Patented Oct. 11, 1898.
W. H. HART.
HINGE.
(Application filed Dec. 8, 1897.)
(No Model.)
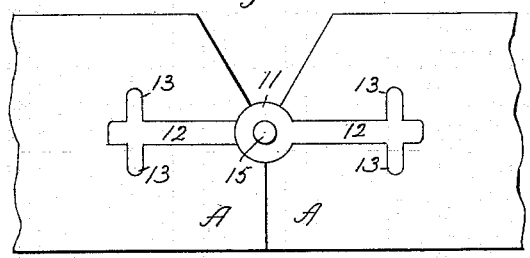
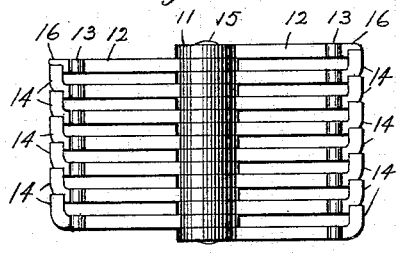
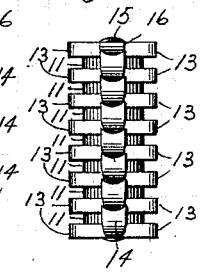
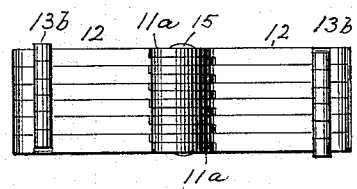
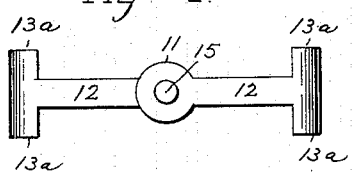
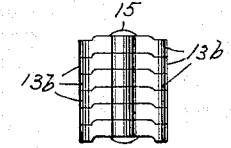
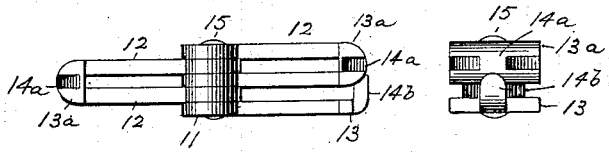
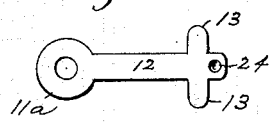
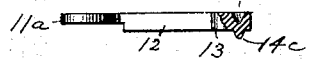
Witnesses
Inventor
William H. Hart.
By James Shepard
Atty.

UNITED STATES PATENT OFFICE.

WILLIAM H. HART, OF NEW BRITAIN, CONNECTICUT, ASSIGNOR TO THE STANLEY WORKS, OF SAME PLACE.

HINGE.

SPECIFICATION forming part of Letters Patent No. 612,201, dated October 11, 1898.

Application filed December 8, 1897. Serial No. 661,157. (No model.)

*To all whom it may concern:*

Be it known that I, WILLIAM H. HART, a citizen of the United States, residing at New Britain, in the county of Hartford and State of Connecticut, have invented certain new and useful Improvements in Hinges, of which the following is a specification.

My invention relates to improvements in hinges; and the main object of my improvement is to produce a hinge of superior strength from plate-leaves, the complete hinge being adapted to be received within mortises in hanging two parts together.

In the accompanying drawings, Figure 1 is a side view of my hinge, together with two pieces of wood hung or secured together by means of said hinge. Fig. 2 is an edge view of said hinge. Fig. 3 is an end view. Fig. 4 is a side view of my hinge of a somewhat different form. Fig. 5 is an edge view of the hinge shown in Fig. 4. Fig. 6 is an end view of the hinge shown in Fig. 4. Fig. 7 is an end view of my hinge in a still different form, although it is the same in side view as the hinge shown in Fig. 1. Fig. 8 is an end view of the hinge shown in Fig. 7. Fig. 9 is a detached side view of one of the plates for a hinge-leaf of the general form of the plates shown in Figs. 7 and 8, but somewhat modified; and Fig. 10 is an edge view of said plate, partly in section.

A A designate two blocks of wood abutting against each other and suitably mortised to receive the hinge of the form therein shown in side view. The leaves of said hinge are composed of plates, each plate having a disk-like hub 11, body 12, wings 13, and, with two exceptions, a stud or lug 14, extending at right angles to the broad side of said plate. The ends of these studs or lugs are notched or recessed slightly, as shown in Fig. 3. The hinge is composed of two series of these plates laid one upon the other and secured together by a pintle 15, extending through the disk-like hub of all the plates, the body of each alternate plate extending in opposite directions, while the notched ends of the studs or lugs of one plate engage the body of the adjacent plate on that side of the pintle, as shown in Figs. 2 and 3. The studs or lugs of the last plate on each side of the pintle are cut off or omitted, as shown at 16 in Figs. 2 and 3.

The series of plates on the respective sides of the pintle constitute the two leaves of the coupled hinge. The lapping of the disks or hubs one upon the other spaces or separates the adjacent plates of each leaf at their pintle end, while the studs or lugs 14 are of a length to space their opposite ends with a like space. These lugs 14 by being notched or recessed at their ends to receive a portion of the adjacent plate also serve the function of locking the several plates in each together at their outer ends, so that when the series of plates move on their pintle they will act as one leaf. The hinge is inserted in place by suitably mortising the two parts to which the hinge is to be applied, the mortises being of a shape to receive the hinge and of a size that will snugly fit the hinge. The hinge is attached by driving or forcing it into the mortises in the endwise direction of its pintle, as the hinge is shown attached in Fig. 1.

The construction shown in Figs. 4, 5, and 6 involves a hinge having leaves composed of a series of plates, each plate having the same disk-like hub 11, substantially the same body 12, wings 13$^a$, and spacing and connecting studs or lugs 14$^a$, the leaves being secured together by the ordinary pintle 15. In this hinge I have employed one plate of the same form as the plates of Figs. 1, 2, and 3, excepting that the end of the stud or lug 14$^b$ is rounded to extend into a recess in the confronting portion of the adjacent plate instead of receiving a rounded portion of such plate in a recess in said lug. The stud or lug 14$^a$ in this hinge serves the same spacing and connecting function as the lug 14 first described; but I form said lug integral with two adjacent plates by cutting a blank long enough for two plates and a lug and then doubling said blank on itself at the middle to space the outer ends of the two plates, as shown by the left-hand leaf in Fig. 5 and by the two upper plates of the right-hand leaf in said Fig. 5. The specific construction of a hinge having the outer ends of two plates of a leaf thus connected and spaced is made the subject of another application, Serial No. 661,271, of even date herewith, and therefore not claimed in this application.

In Figs. 7, 8, 9, and 10 a construction is shown in which the plates have their broad sides resting directly against each other instead of being spaced, as in the foregoing figures. The outer ends of the plates in each leaf are locked together by recesses on one plate and the confronting portion of the next adjacent plate which is received by said recesses, substantially as before described. This hinge is of the same contour in side view as the hinge shown in Fig. 1. The disks or hubs 11$^a$ of each plate are made half the thickness of the body 12 and they are secured together by the pintle 15. In Figs. 9 and 10 each plate has the wings 13, like those of Figs. 1, 2, and 3, and one flat side of each plate at its outer end has a depression or socket 24, while the opposite side has a corresponding projection 14$^c$, as shown. When the plates are assembled in a hinge-leaf, the projection 14$^c$ of one plate enters the corresponding socket 24 of the adjacent plate, thereby locking together the outer ends of all the plates in each leaf. The plates in Figs. 7 and 8 have wings 13$^b$, substantially like the wings 13, only they are slightly offset to bring their ends into a lower plane than the body of the plates. When secured together, the offset wings of one plate fit into those of the adjacent plate, thereby locking all the plates of each hinge-leaf together at their outer ends, as best shown in the end view Fig. 8.

It may be observed that the construction illustrated in Figs. 7, 8, 9, and 10 is like that illustrated in the other figures, besides the general form of the plates, in that a hinge constructed in accordance therewith has its leaves composed of two series of plates united by a common pintle, while said plates have their outer ends secured against independent movement on said pintle, and that the construction illustrated in Figs. 1 to 6, inclusive, involves this same generic feature and in addition thereto has spacing studs or lugs at the outer ends of the plates in each leaf.

While I always prefer to lock or fasten the outer ends of the plates together in each leaf to prevent independent movement on the pintle, this feature is mainly for convenience of inserting the hinge in the mortise. It is evident that when once inserted in the holding-mortises the several plates would have no independent movement, and all the advantage of cheapness of construction and of a hinge of superior strength by reason of its being composed of two series of plates lapped at the pintle will be attained even if the plates are not locked or fastened together at their outer ends. These hinges may have plates enough to make a hinge with any desired length of pintle, and in use one such hinge alone may be used to connect two blocks or parts, or, if desired, two hinges in axial alinement with each other may be employed.

It is apparent that in carrying out my invention some changes from the construction herein shown and described may be made, and I would therefore have it understood that I do not limit myself to the exact form shown, but hold myself at liberty to make such changes and alterations as fairly fall within the spirit and scope of my invention.

I claim as my invention—

1. A hinge the leaves of which consist of two series of plates on a common pintle, the plates in one series being lapped over the plates of the other series at their pintle end while the several plates of each leaf are secured together at their outer ends to prevent independent movement on their pintle, substantially as described.

2. A hinge the leaves of which consist of two series of plates on a common pintle, the plates in one series being lapped over the plates of the other series at the pintle end in alternation, with the plates in one series opposite the space between two plates in the other series, said plates in each series having at their outer ends a spacing and securing stud or lug, substantially as described.

3. A hinge the two leaves of which each consist of one or more substantially flat plates with their broad side faces arranged at right angles to the hinge-pintle, said plates in each leaf being substantially alike and each plate consisting of a single thickness of metal having a disk centrally perforated transversely to its plate-faces, a narrow body extending from the edge of the disk-like hub, and a wing projecting from the edge of the metal in said plate, substantially as described.

WM. H. HART.

Witnesses:
CHAS. E. HART,
GEO. P. ROCKWELL.